United States Patent [19]

Sekai

[11] Patent Number: 5,683,672
[45] Date of Patent: Nov. 4, 1997

[54] NON-AQUEOUS LIQUID ELECTROLYTE SECONDARY CELL

[75] Inventor: Koji Sekai, Kanagawa, Japan

[73] Assignee: Sony Corporation, Tokyo, Japan

[21] Appl. No.: 724,153

[22] Filed: Oct. 1, 1996

Related U.S. Application Data

[63] Continuation of Ser. No. 421,779, Apr. 14, 1995, abandoned.

[30] Foreign Application Priority Data

Apr. 15, 1994 [JP] Japan ................................. 6-101575

[51] Int. Cl.$^6$ ................................................ C01G 49/00
[52] U.S. Cl. ........................... 423/593; 423/594; 423/641; 429/191; 429/193; 429/194; 429/218
[58] Field of Search ........................ 423/593, 594, 423/641; 429/191, 193, 194, 218

[56] References Cited

U.S. PATENT DOCUMENTS

| | | | |
|---|---|---|---|
| 5,196,278 | 3/1993 | Idota | 429/218 |
| 5,401,599 | 3/1995 | Tahara et al. | 429/218 |
| 5,478,674 | 12/1995 | Miyasaka | 429/218 |
| 5,486,346 | 1/1996 | Fey | 429/218 |

*Primary Examiner*—Bruce F. Bell
*Attorney, Agent, or Firm*—Hill, Steadman & Simpson

[57] ABSTRACT

A non-aqueous liquid electrolyte secondary cell employs a vanadium-containing lithium cobalt composite oxide $Li_xV_yCo_{1-y}O_2$, where $1.00 \leq x \leq 1.10$ and $0.01 \leq y \leq 0.04$, is employed as an active material for the positive electrode. Since the vanadium-containing lithium cobalt composite oxide is highly developed in its laminar crystal structure and has a larger grain size, the non-aqueous liquid crystal secondary cell is produced which is high in electrode bulk density and superior in storage characteristics by employing the vanadium-containing lithium cobalt composite oxide as the active material for the positive electrode.

4 Claims, 8 Drawing Sheets

LiCoO₂(x=1.0)

$Li_xV_yCo_{1-y}O_2$ (x=1.1, y=0.02)

FIG. 12

$Li_xV_yCo_{1-y}O_2$ (x=1.1, y=0.04)

NON-AQUEOUS LIQUID ELECTROLYTE SECONDARY CELL

This is a continuation, of application Ser. No. 08/421,779 filed Apr. 14, 1995 now abandoned.

BACKGROUND OF THE INVENTION

This invention relates to a rechargeable non-aqueous liquid electrolyte secondary cell employed as a power source for a variety of electronic apparatus. More particularly, it relates to improvement in an active material for a positive electrode for such cell.

As a rechargeable secondary cell, employed as a power source for a variety of electronic apparatus, a lithium secondary cell (non-aqueous liquid electrolyte secondary cell) is recently attracting attention as having a high energy density.

The non-aqueous electrolyte secondary cell is made up of positive and negative electrodes, capable of doping and undoping lithium metal or lithium ions and a non-aqueous liquid electrolyte comprised of lithium salts dissolved in a non-aqueous solvent.

As the active material for the negative electrode, carbonaceous materials capable of doping and undoping lithium or metal lithium are employed. On the other hand, as the active material for the positive electrode, oxides of transition metals, capable of doping and undoping lithium, such as $LiMn_2O_4$ having a spinel crystal structure or $Li_xMO_2$ having a laminar crystal structure, where M denotes Co or Ni, are employed.

In general, the cyclic characteristics and storage characteristics of a cell, which are characteristics concerning the lowering of the discharge capacity due to storage and self-discharge, depend upon the active materials for the electrodes or the electrolytes. Consequently, with the non-aqueous liquid electrolyte secondary cells, numerous attempts are being conducted in improving the active materials for the electrodes or electrolytes towards improving the above-mentioned characteristics.

As for the active materials for the positive electrode, there is proposed $Li_xCoO_2$ having a laminar crystal structure in JP Patent Kokoku Publication JP-B-63-59507. This oxide $Li_xCoO_2$ is useful as the active material for the positive electrode for the non-aqueous liquid electrolyte secondary cell since it exhibits a potential not lower than 4.0 V vs $Li/Li^+$ or a larger amount of lithium insertion desorption.

However, the oxide $Li_xCoO_2$ has a high electrode potential as discussed above and hence is liable to, for example, self-discharge, so that it needs to be improved in this respect.

Attempts have hitherto been made towards improving storage characteristics by substituting extraneous metals, such as Al, In, Sn, W, Mn, Ta, Ti or Nb for part of the element Co in $Li_xCoO_2$.

For example, U.S. Pat. No. 4,668,595 proposes $A_xM_yN_zO_2$, where A denotes an alkali metal, x is such that $0.05 \leq x \leq 1.10$, M denotes a transition metal, y is such that $0.85 \leq y \leq 1.10$, N denotes Al, In or Sn and z is such that $0.001 \leq z \leq 0.10$. JP Patent Kokai Publication No. 63-121258 proposes $A_xB_yC_zD_wO_2$, where A denotes an alkali metal, x is such that $0.05 \leq x \leq 1.10$, B denotes a transition metal, y is such that $0.85 \leq y \leq 1.10$, C denotes Al, In or Sn, z is such that $0.001 \leq z \leq 0.10$ and D denotes alkali metals other than A, transition metals other than B, group IIa elements, Al, In, An and elements of the second to sixth period elements of the group IIIb to VI and w is such that $0.001 \leq w \leq 0.10$, as the active material for the positive electrode. In addition, JP Patent Kokai Publication JP-A-3-201368 proposes $Li_xCo_{1-y}M_yO_2$, where x is such that $0.85 \leq x \leq 1.3$, y is such that $0.05 \leq y \leq 0.35$ and M is at least one element selected from the group consisting of W, Mn, Ta, Ti and Nb.

In addition, in the JP Patent Kokai Publication No. 4-328260, $LiM_{1-x}V_xO_2$ (M=Co, Ni; $0 < x \leq 0.5$) containing vanadium is proposed for the purpose of restricting decomposition of a non-aqueous liquid electrolyte at the positive electrode and the like.

However, solid dissolution of the extraneous metals cannot sufficiently improve the characteristics of $Li_xCoO_2$ as the active material for the positive electrode.

On the other hand, if the compound of the extraneous metal to form a solid solution with $Li_xCoO_2$ is added to a starting composition for $Li_xCoO_2$ during the synthesis process, the grain size is reduced due to growth suppression. The bulk density of the electrode cannot be increased with the active material for the positive electrode having the small grain size, as a result of which the discharge capacity of the cell is lowered.

SUMMARY OF THE INVENTION

In view of the foregoing, it is an object of the present invention to provide a non-aqueous liquid electrolyte secondary cell wherein storage characteristics of the cell may be improved without lowering the bulk density of the electrode.

According to the present invention, an oxide having a highly developed laminar crystal structure may be obtained by replacing part of Co of $Li_xCoO_2$ with V for a minute amount by substitutional solid dissolution, without comminuting the grain size. If the oxide so produced is employed as the positive electrode material of a cell, superior storage characteristics of the cell may be achieved.

Thus the present invention provides a non-aqueous liquid electrolyte cell wherein a vanadium-containing lithium cobalt composite oxide represented by the formula $Li_xV_yCo_{1-y}O_2$, where x is such that $1.00 \leq x \leq 1.10$ and y is such that $0.01 \leq y \leq 0.04$, is employed as an active material for the positive electrode.

In a powder X-ray diffraction diagram for the vanadium-containing lithium cobalt composite oxide, the ratio of diffraction intensity of the (003) crystal plane I(003) to diffraction intensity of the (104) crystal plane I(104) is such that $4 \leq I(003)/I(104) \leq 25$.

In addition, the mean grain size of the vanadium-containing lithium cobalt composite oxide is 5 to 30 μm.

The non-aqueous liquid electrolyte secondary cell according to the present invention includes positive and negative electrodes, capable of doping and undoping metal lithium and lithium ions and a non-aqueous liquid electrolyte having a lithium salt dissolved in a non-aqueous solvent.

According to the present invention, the vanadium-containing lithium cobalt composite oxide represented by the formula $Li_xV_yCo_{1-y}O_2$, where x is such that $1.00 \leq x \leq 1.10$ and y is such that $0.01 \leq y \leq 0.04$, is employed as an active material for the positive electrode of the non-aqueous liquid electrolyte secondary cell.

The vanadium-containing lithium cobalt composite oxide represented by the formula $Li_xCoO_2$ is an oxide having a laminar crystal structure. If part of the element Co in the formula is replaced by the element V by substitutional solid dissolution, there is produced the oxide $Li_xV_yCo_{1-y}O_2$ which is developed further in its laminar crystal structure than the above oxide $Li_xCoO_2$.

If the oxide $Li_xV_yCo_{1-y}O_2$ having the developed laminar crystal structure is employed as the active material for the positive electrode, a non-aqueous liquid electrolyte secondary cell may be realized in which the lowering of the discharge capacity due to self-discharge and storage is suppressed and which exhibits superior storage characteristics.

On the other hand, an oxide having an extraneous metal other than V, such as Ti, Mo or Cr, substitutionally solid-dissolved in $Li_xCoO_2$, has its grain comminuted by substitutional solid-dissolution of the extraneous metal, thus lowering the bulk density of the resulting electrode. With $Li_xV_yCo_{1-y}O_2$ having vanadium substitutionally solid-dissolved therein, it becomes possible to prevent the grain from being comminuted by controlling the Li atomic ratio. Thus, by employing $Li_xV_yCo_{1-y}O_2$ as the active material for the positive electrode, it becomes possible to improve the storage characteristics while maintaining the electrode bulk density.

The atomic ratio x of Li in $Li_xV_yCo_{1-y}O_2$ is set to 1.00 to 1.10. If the atomic ratio x of Li is less than 1.00, a sufficient cell capacity cannot be achieved because of shortage of the Li quantity in the cell. If the atomic ratio x of Li exceeds 1.10, Li oxides are yielded as impurities during the synthetic process along with $Li_xV_yCo_{1-y}O_2$, thereby lowering the purity of the active material for the positive electrode.

For sufficiently manifesting the effect of V, it is necessary for the atomic ratio y of V to be in a range of from 0.01 to 0.04. Substitutional solid dissolution of V in this range promotes the development of the laminar crystal structure of the oxide. If the atomic ratio y of V is less than 0.01, or exceeds 0.04 as in the embodiment in the JP Patent Kokai Publication No.4-328260, the crystal structure of the oxide cannot be developed sufficiently. Above all, with too large the atomic ratio y of V, it is not possible for V to be substitutionally solid-dissolved in its entirety during the synthesis process, so that impurities are yielded by the excess V along with $Li_xV_yCo_{1-y}O_2$, thus lowering the purity of the active material for the positive electrode.

With the oxides $Li_xV_yCo_{1-y}O_2$ having the above composition, the laminar crystal structure is fully developed by the substitutional solid dissolution of V. Of these oxides, those in which, in the X-ray diffraction spectrum, the ratio of diffraction intensity of the (003) crystal plane I(003) to diffraction intensity of the (104) crystal plane I(104) is such that $4 \leq I(003)/I(104) \leq 25$, are most preferred. The larger the value of the ratio, the more pronounced is the development of the laminar crystal structure. If the oxide $Li_xV_yCo_{1-y}O_2$ having the ratio I(003)/I(104) in the range of from 4 to 25 is employed as the active material for the positive electrode, the resulting cell has more excellent storage characteristics.

The grain size of $Li_xV_yCo_{1-y}O_2$ may be prevented from being reduced by controlling the atomic ratio of Li, as previously discussed. The grain size for $Li_xV_yCo_{1-y}O_2$ is preferably 5 to 30 μm and more preferably 10 to 20 μm. If the grain size is less than 5 μm, the electrode bulk density cannot be raised sufficiently, whereas, if the grain size exceeds 30 μm, the grain size becomes excessive to cause separator breakage and even inner shorting.

While the vanadium-containing lithium cobalt composite oxide is employed in the present invention as the active material for the positive electrode, the active material for the negative electrode or the non-aqueous liquid electrolyte may be any of those commonly employed in the non-aqueous liquid electrolyte secondary cell.

The active material for the negative electrode may be any of those materials capable of doping and undoping lithium.

For example, lithium occluding materials, such as electrically conductive high molecular materials, carbonaceous materials or metal oxides, in the form of laminar compounds, may be employed in addition to metal lithium or lithium alloys.

As the electrolyte, it is possible to use a solution of lithium salts, such as $LiPF_6$, $LiBF_4$, $LiAsF_6$, $LiClO_4$ or $LiCF_3SO_3$ in a solvent such as ethylene carbonate, propylene carbonate or γ-butyrolactone or a mixed solvent of one or more of these solvents in diethyl carbonate, dimethyl carbonate, methyl-ethyl carbonate or 1,2-dimethoxyethane.

The lithium cobalt composite oxide, represented by the formula $Li_xCoO_2$, is an oxide having a laminar crystal structure and, if part of the element Co making up the oxide is replaced by the element V by substitutional solid dissolution, there is produced an oxide $Li_xV_yCo_{1-y}O_2$, in which x is such that $1.00 \leq x \leq 1.10$ and y is such that $0.01 \leq y \leq 0.04$, and in which the laminar crystal structure is developed more pronouncedly than $Li_xCoO_2$.

If $Li_xV_yCo_{1-y}O_2$ having the developed laminar crystal structure is used for constituting the positive electrode as the active material, the non-aqueous liquid electrolyte secondary cell is produced in which the lowering of the discharge capacity due to self-discharge or storage is suppressed and which exhibits superior storage characteristics.

With the oxide $Li_xCoO_2$ having an extraneous metal other than V, such as Ti, Mo or Cr, substitutionally solid-dissolved therein, the grain size is comminuted by such substitutional solid dissolution of the extraneous metal, thereby lowering the electrode bulk density. With $Li_xV_yCo_{1-y}O_2$ having V substitutionally solid dissolved therein, the grain size comminution may be suppressed by controlling the Li atomic ratio. Therefore, if the positive electrode is constituted by employing $Li_xV_yCo_{1-y}O_2$ as the active material, the electrode bulk density mat be maintained while improving cell storage characteristics.

Of the oxides $Li_xV_yCo_{1-y}O_2$, those in which the ratio I(003)/I(104) is in the range of from 4 to 25 in the X-ray diffraction spectrum may be selected as the active material for the positive electrode, whereby a cell having improved storage characteristics may be achieved.

According to the present invention, the non-aqueous liquid electrolyte cell wherein a vanadium-containing lithium cobalt composite oxide represented by the formula $Li_xV_yCo_{1-y}O_2$, where x is such that $1.00 \leq x \leq 1.10$ and y is such that $0.01 \leq y \leq 0.04$, is employed as an active material for the positive electrode. The vanadium-containing lithium cobalt composite oxide has a highly developed laminar crystal structure and a larger crystal grain size. Consequently, by employing such composite oxide as the active material for the positive electrode, there is produced a non-aqueous liquid electrolyte secondary cell having high electrode bulk density and superior storage characteristics.

DETAILED DESCRIPTION OF THE PREFERRED EMBODIMENTS

The present invention will be explained with reference to illustrative Examples based on experimental results.

Identification of Sintered Products

First, $Li_xV_yCo_{1-y}O_2$ with different atomic ratios were synthesized in the following manner.

Lithium compounds, such as lithium carbonate ($Li_2CO_3$), cobalt compounds, such as tricobalt tetraoxide ($Co_3O_4$) and vanadium compounds, such as vanadium pentaoxide ($V_2O_5$) were weighed and mixed, while arbitrarily changing the numbers of mols of Li, Co and V, to prepare starting compositions. The numbers of mols of Li, Co and V are herein denoted as $M_{Li}$, $M_{Co}$ and $M_V$, respectively. These starting compositions were sintered at approximately 900° to 1000° C. under ambient atmosphere to synthesize oxides 1 to 8. The atomic ratios $M_{Li}/(M_V+M_{Co})$ and $M_V$ and $M_V/(M_V+M_{Co})$ of the starting compositions employed for synthesizing the oxides are shown in Table 1. In this case, it is preferable to use vanadium trioxide ($V_2O_3$) as a vanadium compound. Thus, $V_2O_3$ was used.

TABLE 1

| | $M_{Li}/(M_V + M_{Co})$ | $M_V/(M_V + M_{Co})$ |
| --- | --- | --- |
| Oxide 1 | 1.0 | 0 |
| Oxide 2 | 1.0 | 0.03 |
| Oxide 3 | 1.0 | 0.04 |

TABLE 1-continued

| | $M_{Li}/(M_V + M_{Co})$ | $M_V/(M_V + M_{Co})$ |
| --- | --- | --- |
| Oxide 4 | 1.1 | 0.02 |
| Oxide 5 | 1.1 | 0.04 |
| Oxide 6 | 1.1 | 0.05 |
| Oxide 7 | 1.2 | 0.02 |
| Oxide 8 | 1.2 | 0.06 |

Measurements were then made of the resulting oxides by powder X-ray diffractiometry. The X-ray diffraction spectrum of each of the oxides 1 to 8 is shown in FIGS. 1 to 8.

Figure 1:
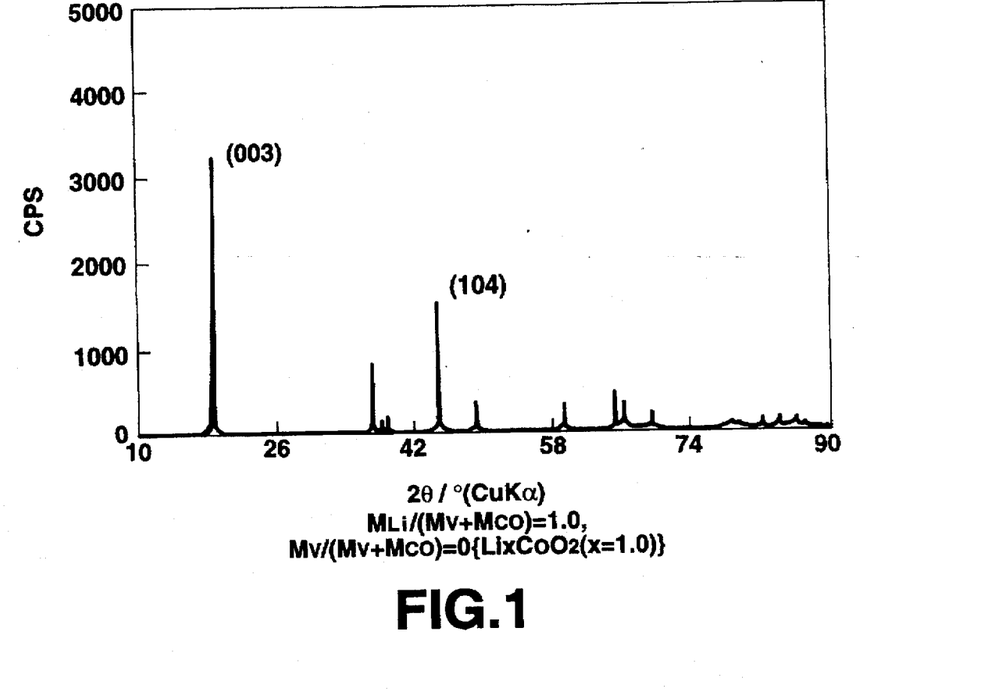
FIG. 1 is a graph showing an X-ray diffraction spectrum of an oxide produced by setting $M_{Li}$, $M_{Co}$ and $M_V$ of the starting composition to $M_{Li}/(M_V+M_{Co})=1.0$ and by setting $M_V/(M_V+M_{Co})=0$.
Figure 2:
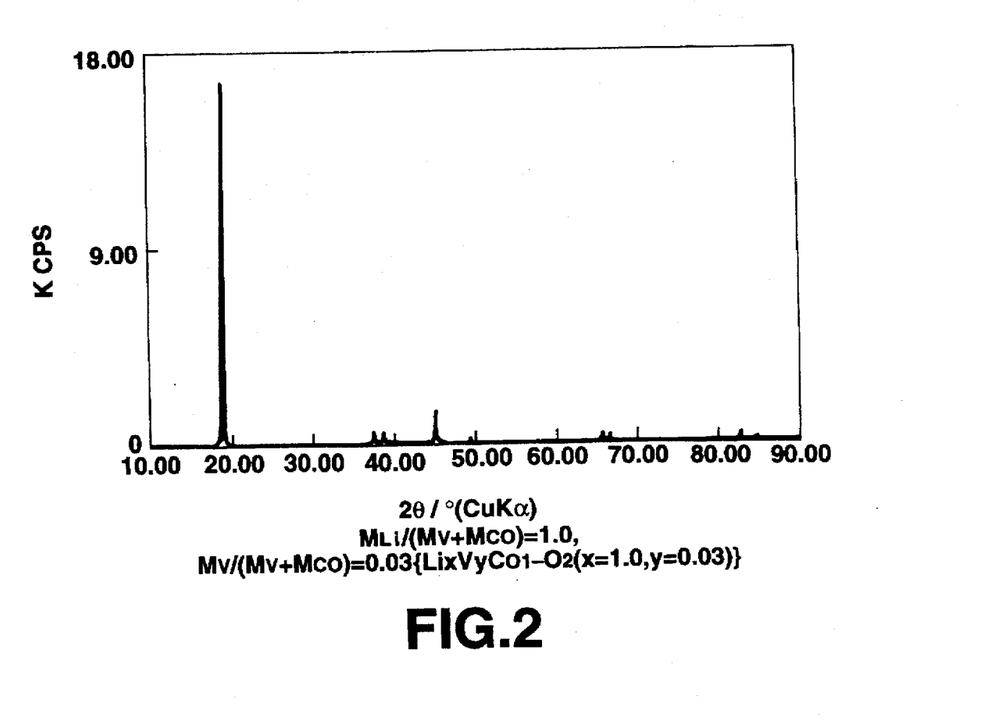
FIG. 2 is a graph showing an X-ray diffraction spectrum of an oxide produced by setting $M_{Li}$, $M_{Co}$ and $M_V$ of the starting composition to $M_{Li}/(M_V+M_{Co})=1.0$ and by setting $M_V/(M_V+M_{Co})=0.03$.
Figure 3:
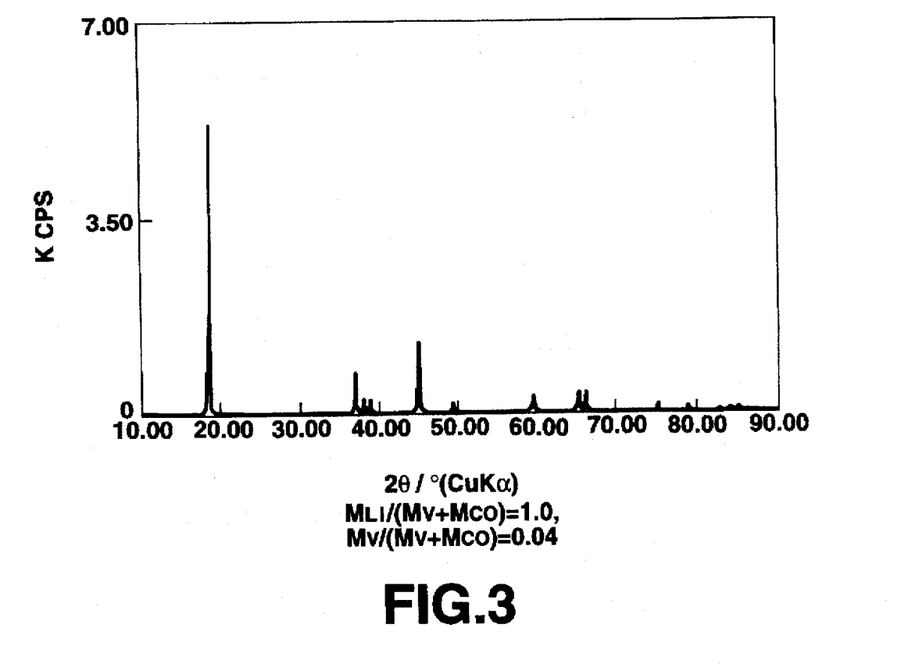
FIG. 3 is a graph showing an X-ray diffraction spectrum of an oxide produced by setting $M_{Li}$, $M_{Co}$ and $M_V$ of the starting composition to $M_{Li}/(M_V+M_{Co})$=1.0 and by setting $M_V/(M_V+M_{Co})$=0.04.
Figure 4:
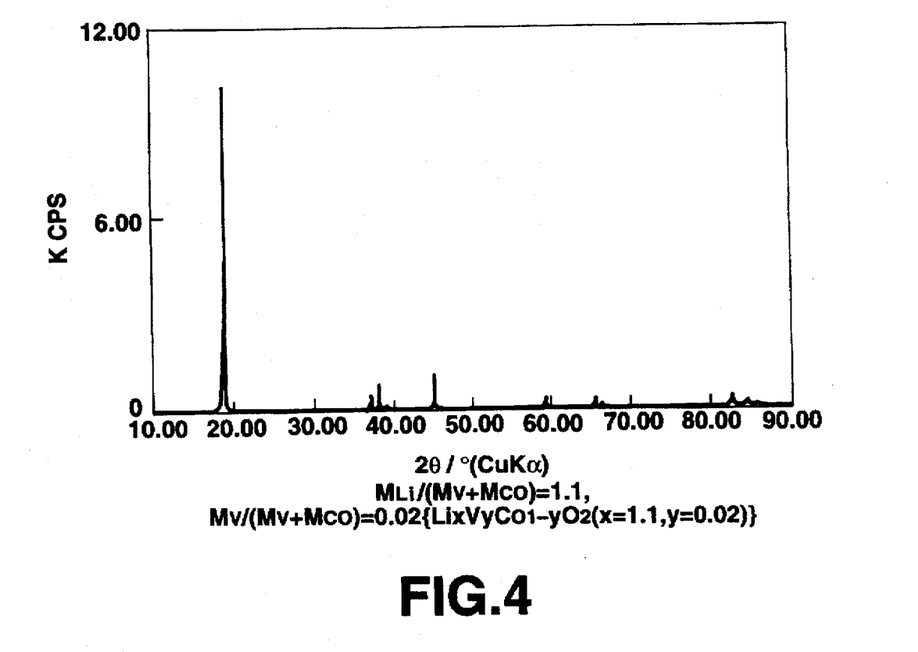
FIG. 4 is a graph showing an X-ray diffraction spectrum of an oxide produced by setting $M_{Li}$, $M_{Co}$ and $M_V$ of the starting composition to $M_{Li}/(M_V+M_{Co})$=1.1 and by setting $M_V/(M_V+M_{Co})$=0.02.
Figure 5:
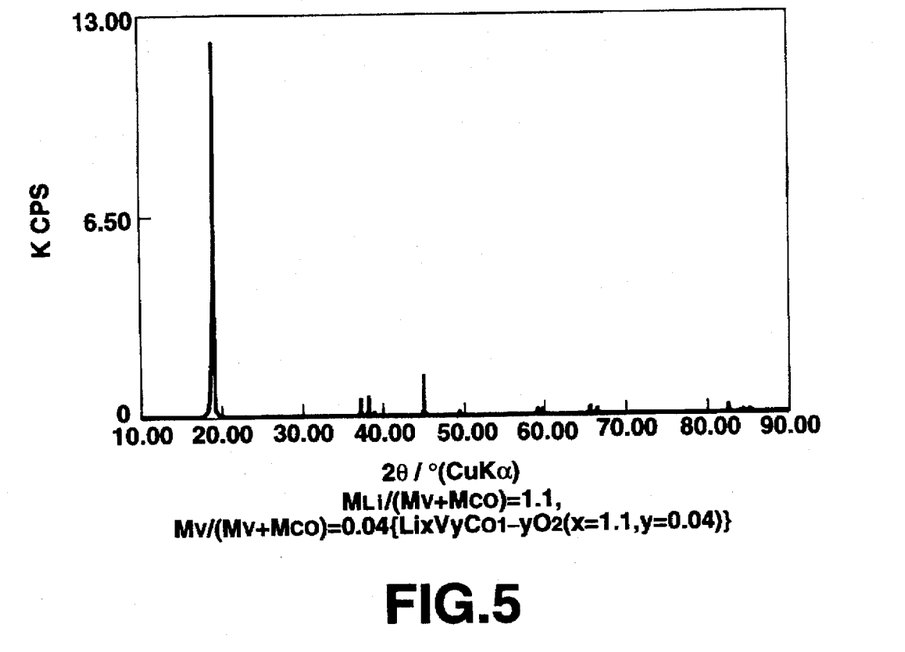
FIG. 5 is a graph showing an X-ray diffraction spectrum of an oxide produced by setting $M_{Li}$, $M_{Co}$ and $M_V$ of the starting composition to $M_{Li}/(M_V+M_{Co})$=1.1 and by setting $M_V/(M_V+M_{Co})$=0.04.
Figure 6:
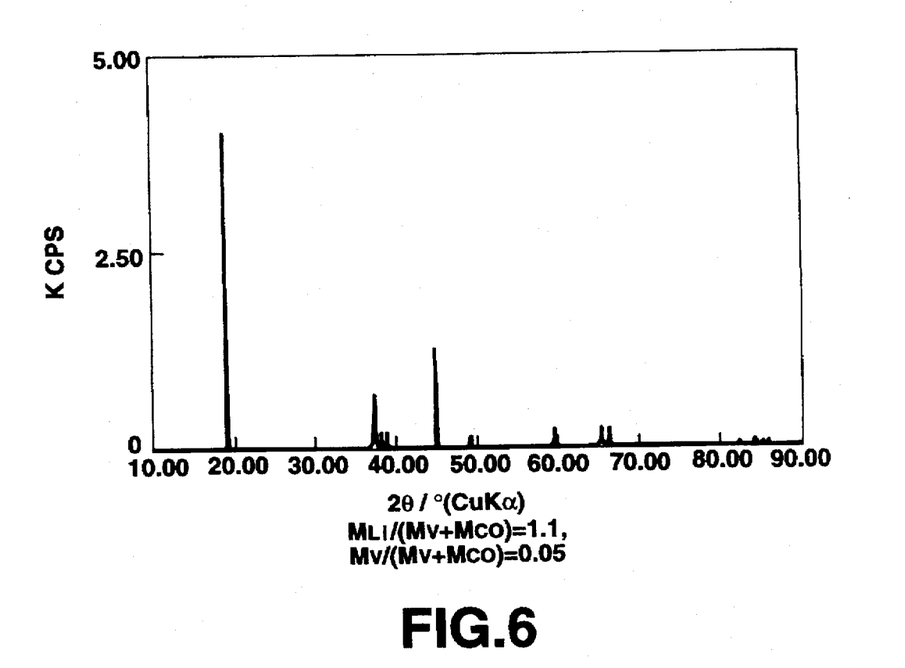
FIG. 6 is a graph showing an X-ray diffraction spectrum of an oxide produced by setting $M_{Li}$, $M_{Co}$ and $M_V$ of the starting composition to $M_{Li}/(M_V+M_{Co})$=1.1 and by setting $M_V/(M_V+M_{Co})$=0.05.
Figure 7:
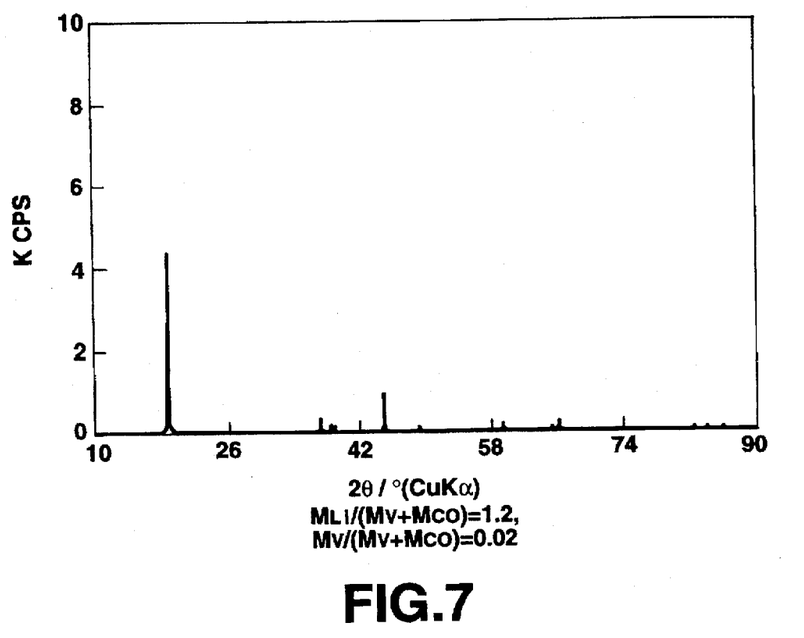
FIG. 7 is a graph showing an X-ray diffraction spectrum of an oxide produced by setting $M_{Li}$, $M_{Co}$ and $M_V$ of the starting composition to $M_{Li}/(M_V+M_{Co})$=1.2 and by setting $M_V/(M_V+M_{Co})$=0.02.
Figure 8:
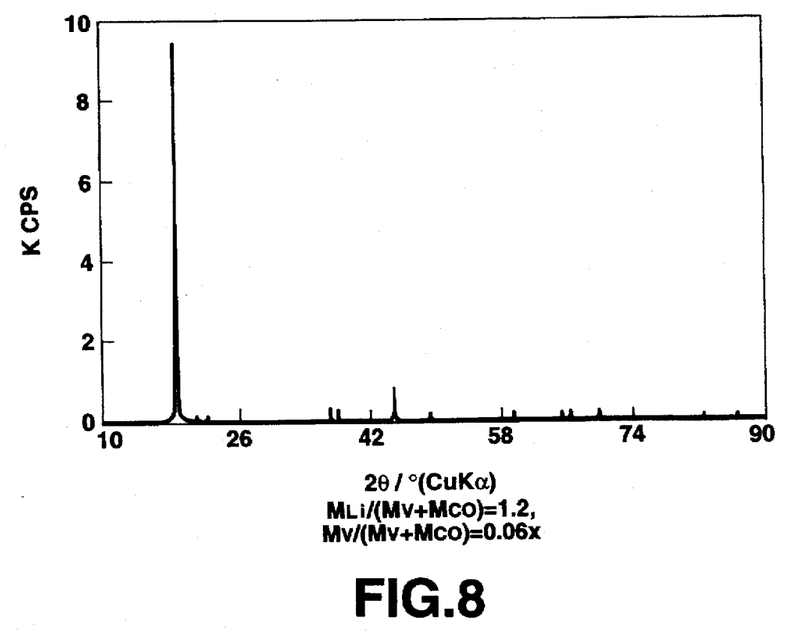
FIG. 8 is a graph showing an X-ray diffraction spectrum of an oxide produced by setting $M_{Li}$, $M_{Co}$ and $M_V$ of the starting composition to $M_{Li}/(M_V+M_{Co})$=1.2 and by setting $M_V/(M_V+M_{Co})$=0.06.

Analyses of the X-ray diffraction spectrum of each of FIGS. 1, 2 and 4 indicates that all of the diffraction peaks observed therein may substantially be attributed to $Li_xCoO_2$ having a laminar crystal structure. From this it may be concluded that the oxide 1 in which $M_{Li}$, $M_{Co}$ and $M_V$ of the starting compositions are set such that $M_{Li}/(M_V+M_{Co})$=1.0 and $M_V/(M_V+M_{Co})$=0 is a laminar lithium transition metal composite oxide represented by $Li_xCoO_2$ (x=1.0), the oxide 2 in which $M_{Li}$, $M_{Co}$ and $M_V$ of the starting compositions are set such that $M_{Li}/(M_V+M_{Co})$=1.0 and $M_V/(M_V+M_{Co})$=0.03 is a laminar lithium transition metal composite oxide represented by $Li_xV_yCo_{1-y}O_2$ (x=1.0, y=0.03) and that the oxide 4 in which $M_{Li}$, $M_{Co}$ and $M_V$ of the starting compositions are set such that $M_{Li}/(M_V+M_{Co})$=1.1 and $M_V/(M_V+M_{Co})$=0.02 is a laminar lithium transition metal composite oxide represented by $Li_xV_yCo_{1-y}O_2$ (x=1.1, y=0.02).

Analyses of the X-ray diffraction spectrum of each of FIGS. 3 and 5 to 8 indicate small peaks not attributable to $Li_xCoO_2$, in addition to the diffraction peaks attributable to $Li_xCoO_2$. Thus it may be presumed that impurities other than the laminar lithium transition metal composite oxides are contained in the oxides 3 and 5 to 8. Thus it may be presumed that the main component of the oxide 3 in which $M_{Li}$, $M_{Co}$ and $M_V$ of the starting compositions are set such that $M_{Li}/(M_V+M_{Co})$=1.0 and $M_V/(M_V+M_{Co})$=0.04 is a laminar lithium transition metal composite oxide approximately represented by $Li_xV_yCo_{1-y}O_2$ (x=1.1, y=0.04), while the main component of the oxide 5 in which $M_{Li}$, $M_{Co}$ and $M_V$ of the starting compositions are set such that $M_{Li}/(M_V+M_{Co})$=1.1 and $M_V/(M_V+M_{Co})$=0.04 is a laminar lithium transition metal composite oxide approximately represented by $Li_xV_yCo_{1-y}O_2$ (x=1.1, y=0.04). Similarly, the main component of the oxide 6 in which $M_{Li}$, $M_{Co}$ and $M_V$ of the starting compositions are set such that $M_{Li}/(M_V+M_{Co})$=1.1 and $M_V/(M_V+M_{Co})$=0.05 is a laminar lithium transition metal composite oxide approximately represented by $Li_xV_yCo_{1-y}O_2$ (x=1.1, y=0.05) and the main component of the oxide 7 in which $M_{Li}$, $M_{Co}$ and $M_V$ of the starting compositions are set such that $M_{Li}/(M_V+M_{Co})$=1.2 and $M_V/(M_V+M_{Co})$=0.02 is a laminar lithium transition metal composite oxide approximately represented by $Li_xV_yCo_{1-y}O_2$ (x=1.2, y=0.02), while the main component of the oxide 8 in which $M_{Li}$, $M_{Co}$ and $M_V$ of the starting compositions are set such that $M_{Li}/(M_V+M_{Co})$=1.2 and $M_V/(M_V+M_{Co})$=0.08 is a laminar lithium transition metal composite oxide approximately represented by $Li_xV_yCo_{1-y}O_2$ (x=1.2, y=0.06).

From the above results, it is seen that, by mixing and sintering the lithium compound, cobalt compound and the vanadium compound with mol numbers within a pre-set range, there may be synthesized a substitutional solid solution $Li_xV_yCo_{1-y}O_2$ containing V as a solute element.

Investigations into Effect of Substitutional Solid Dissolution of V

The storage characteristics of the positive terminal depends mainly on the state of development of its crystal structure. The state of development of $Li_xV_yCo_{1-y}O_2$ may be evaluated by the ratio of the intensity of diffraction of the (003) crystal plane to the intensity of diffraction of the (104) crystal plane, that is the ratio I(003)/I(104), as observed on the X-ray diffraction spectrum of FIGS. 1 to 8. It may be concluded that the larger the value of the ratio I(003)/I(104), the higher is the degree of development of the laminar crystal structure.

The effect on the crystal structure of the substitutional solid dissolution of V was checked by the ratio I(003)/I(104) as found by the X-ray diffraction spectrum.

The starting compositions were prepared with the ratio $M_{Li}/(M_V+M_{Co})$ being fixed at 1.0 or 1.1 and with the ratio $M_V/(M_V+M_{Co})$ being changed in a range of from 0 to 0.05. The starting compositions thus prepared were sintered under the same conditions as above for synthesizing $Li_xV_yCo_{1-y}O_2$.

The X-ray diffraction spectrum of each produced oxide was observed in order to judge whether the oxide was of the single phase or a mixed phase containing impurities therein. From the X-ray diffraction spectrum, the ratio of the intensity of diffraction I(003) of the (003) crystal plane to the intensity of diffraction I(104) of the (104) crystal plane, that is I(003)/I(104), was found.

The values of the ratio I(003)/I(104) thus found were plotted, against the values of the atom ratio y of V of $Li_xV_yCo_{1-y}O_2$, that is $[M_V/(M_V+M_{Co})]$ on the abscissa in order to check the relation between the substitutional dissolution of V and the state of development of the laminar crystal structure. The results are shown in FIG. 9, in which a solid-line curve stands for the case of $Li_xV_yCo_{1-y}O_2$ found to be of a sole phase and a broken-line curve stands for the case of $Li_xV_yCo_{1-y}O_2$ found to contain impurities therein.

Figure 9:
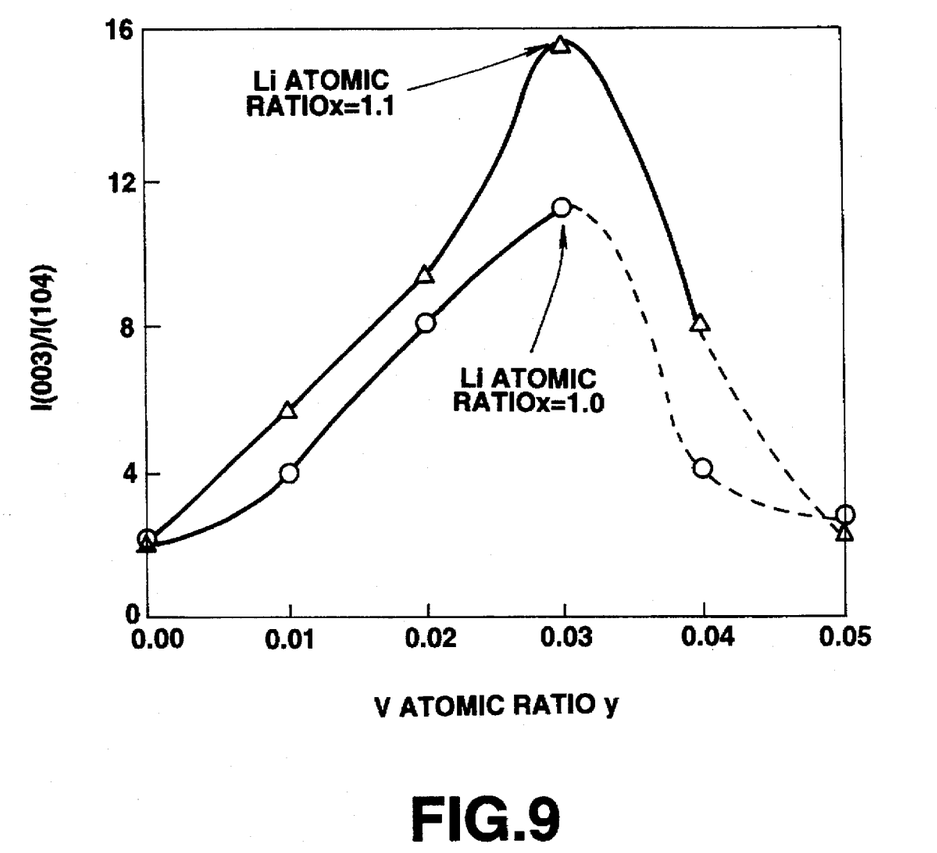
FIG. 9 is a graph showing the relation between the atom ratio y of V of $Li_xV_yCo_{1-y}O_2$ and I(003)/I(104).

It is seen from FIG. 9 that, if the Li atom ratio x is 1.0 or 1.1, the value of the ratio I(003)/I(104) is changed in dependence upon the proportion y of V in $Li_xV_yCo_{1-y}O_2$. If the proportion y is in a range up to 0.03, the value of the ratio I(003)/I(104) is changed with increase in the value of y. If the proportion y exceeds 0.03, the value of the ratio I(003)/I(104) is decreased with increase in the proportion y. If follows from this that the value of the ratio I(003)/I(104), that is the laminar crystal structure of $Li_xV_yCo_{1-y}O_2$, may be controlled by the proportion y of V. It is seen that, by setting the atomic ratio y of V to 0.01 to 0,04, it is possible to produce $Li_xV_yCo_{1-y}O_2$ exhibiting a developed laminar crystal structure.

On the other hand, the impurities are produced at all times when the atom ratio of V is increased, although at varying time points depending upon the atom ratio x of Li. From this it may be surmised that the impurities are derived from the element V which has remained in an undissolved state. It may be presumed that, for the atomic ratio x for Li equal to 1.0 and 1.1, the atomic ratio y for V equal to 0.03 and 0.04 represent the limit of solid dissolution of V, respectively.

The above results demonstrate that, for developing the laminar crystal structure, it is preferred for the atomic ratio y of V to be in a range of from 0.01 to 0.04, and that, for prohibiting the mixing of impurities, it is more preferred for the upper limit of the atomic ratio X to be at a point in the above range corresponding to the limit of solid dissolution, if there be any.

Of the synthesized oxides, $Li_xCoO_2$ (x=1.0), $Li_xV_yCo_{1-y}O_2$ (x=1.0, y=0.02), $Li_xV_yCo_{1-y}O_2$ (x=1.1, y=0.02) and $Li_xV_yCo_{1-y}O_2$ (x=1.1, y=0.04) were observed over a scanning electron microscope (SEM) as to their grain shape. Also the grain sizes of these oxides were measured by the light diffraction method using a laser beam. FIGS. 10 to 13 show the grain shape as observed by the SEM. FIGS. 10, 11, 12 and 13 show the grain shape of $Li_xCoO_2$ (x=1.0), $Li_xV_yCoO_2$ (x=1.0, y=0.02), $Li_xV_yCo_{1-y}O_2$ (x=1.1, y=0.02) and $Li_xV_yCo_{1-y}O_2$ (x=1.1, y=0.04), respectively. It is seen from FIGS. 11 to 13 that the grain size of the oxide is affected by the atomic ratios of Li and V.

Figure 10:
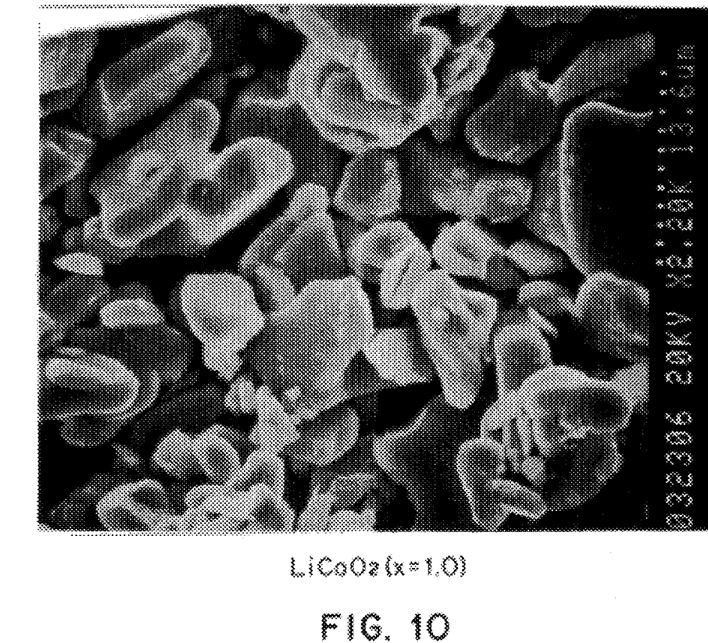
FIG. 10 is a photo taken with a SEM for showing the grain structure of $Li_xCoO_2$ (x=1.0).
Figure 11:
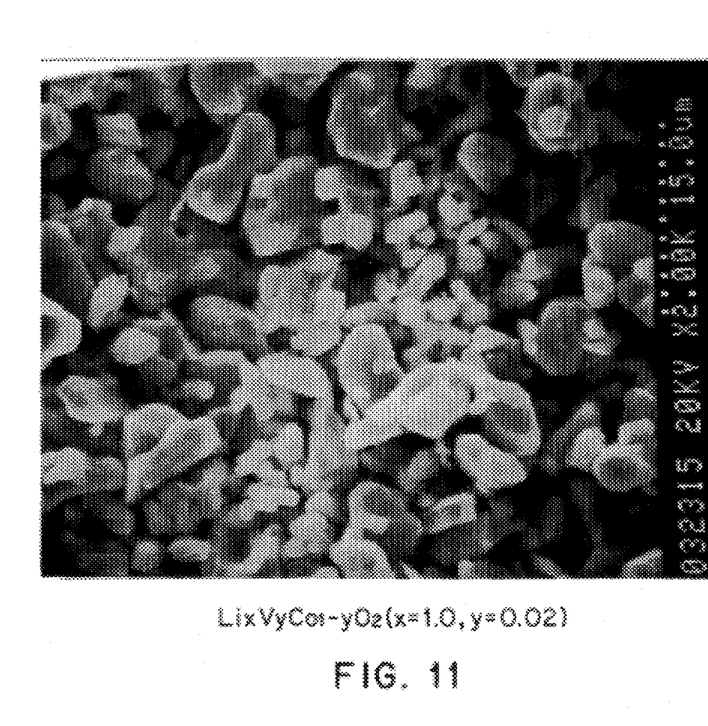
FIG. 11 is a photo taken with a SEM for showing the grain structure of $Li_xV_yCo_{1-y}O_2$ (x=1.0, y=0.02).
Figure 12:
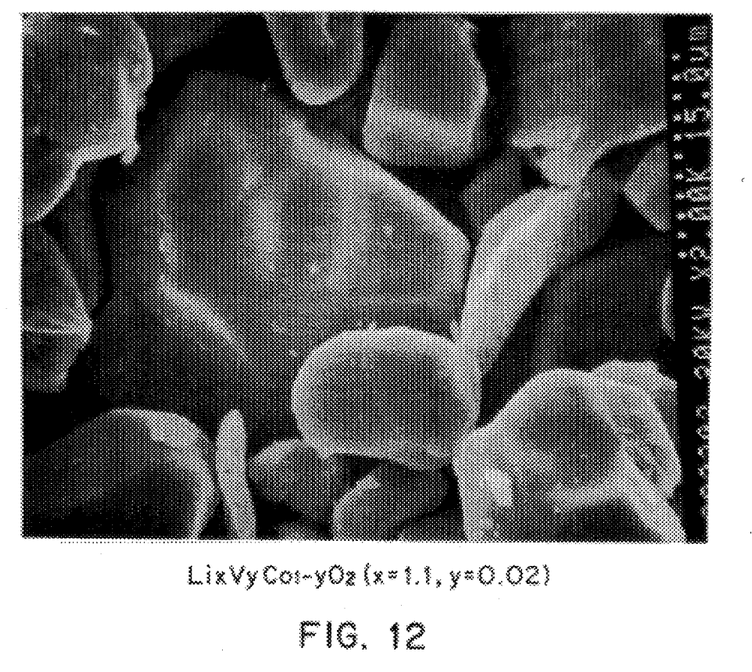
FIG. 12 is a photo taken with a SEM for showing the grain structure of $Li_xV_yCo_{1-y}O_2$ (x=1.1, y=0.02).
Figure 13:
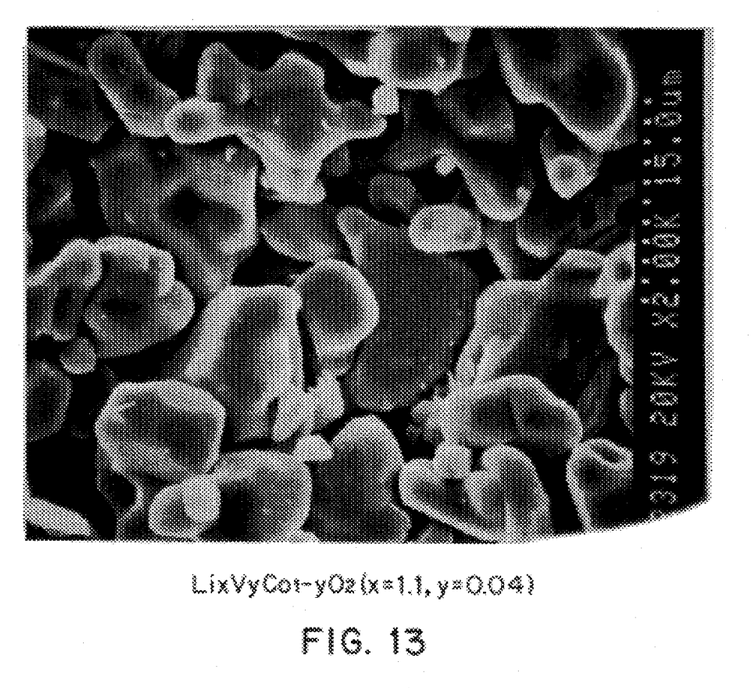
FIG. 13 is a photo taken with a SEM for showing the grain structure of $Li_xV_yCo_{1-y}O_2$ (x=1.1, y=0.04).

That is, comparison of the SEM photo of FIG. 10 with the remaining SEM photos reveals that, while $Li_xV_yCo_{1-y}O_2$ containing substitutionally solid-dissolved vanadium exhibits the particle shape analogous to that of $Li_xV_yCo_{1-y}O_2$, its crystal size is markedly diminished by substitutional solid dissolution of V if the atomic ratio x of Li is equal to 1.0 (FIG. 11). Such phenomenon is analogous to a known phenomenon in which $Li_xCoO_2$ becomes finely pulverulent, with the mean grain size of approximately 1 μm or less, on substitution of extraneous metals, such as Ti, Mo or Cr, for part of Co in $Li_xV_yCo_{1-y}O_2$.

Conversely, if the atomic ratio x of Li is 1.1 (FIGS. 12 and 13), such pulverization is not produced on substitutional solid dissolution of V. The oxide $Li_xV_yCo_{1-y}P_2$, with the atomic ratio x of Li equal to 1.1, has a grain size larger than that of $Li_xCoO_2$ if V is substitutionally solid dissolved at the atomic ratio of 0.02, while having the grain size substantially equal to that of $Li_xCoO_2$, if V is substitutionally solid dissolved at the atomic ratio of 0.04, with the mean grain size as measured with the light diffraction method being approximately 5 to 30 μm.

Thus, with $Li_xV_yCo_{1-y}O_2$ having vanadium substitutionally solid-dissolved therein, the crystal grain may be prohibited from being comminuted by controlling the Li atomic ratio, in distinction from the same oxide having other extraneous metals substitutionally dissolved therein, thus assuring the electrode bulk density and allowing it to develop the laminar crystal structure.

Scrutiny into Cell Characteristics

A cell was actually produced, using $Li_xV_yCo_{1-y}O_2$ as a material for an active material for a positive electrode, and the lowering of the discharge capacity caused by self-discharge and storage was measured for evaluating storage characteristics.

For producing the positive electrode, a starting composition was prepared with the ratio $M_{Li}/(M_V+M_{Co})$ being fixed at 1.0 and with the ratio $M_V/(M_V+M_{Co})$ being changed in a range of from 0 to 0.04. The resulting starting composition was sintered under the same conditions as above for synthesizing $Li_xV_yCo_{1-y}O_2$ (x=1.0, $0.00 \leq y \leq 0.04$).

The active material for the positive electrode $Li_xV_yCo_{1-y}O_2$ was mixed with graphite powders as an electrical conduction assisting agent and fluorine resin powders as a binder and the resulting mixture was molded under pressure to form a disc-shaped positive electrode.

With the positive electrode, a negative electrode of metal lithium and a non-aqueous liquid electrolyte, having $LiPF_6$ dissolved at a concentration of 1 mol.dm$^{-3}$, in a mixed solvent of propylene carbonate and dimethyl carbonate at a volume ratio of 1:1, a coin-shaped cell having a diameter of 20 mm and a thickness of 2.5 mm was prepared.

The coin-shaped electrode thus produced was repeatedly charged and discharged by the following charging/discharging cycles and the discharging capacity was measured for each cycle.

That is, for charging, charging was conducted with a constant current of 0.5 mA with the upper voltage being set to 4.2 V and was further continued for five hours at a constant voltage of 4.2 V. Discharging was conducted with a constant current of 0.5 mA, with the terminal voltage being set to 3.0 V. The discharging capacity was measured in a constant temperature chamber maintained at 23° C.

Four cycles of the above-mentioned charging and discharging were carried out, after which one charging cycle was conducted and the cell was stored in a constant temperature vessel of 60° C. for 18 hours in the 4.2 V charged state.

After storage, the cell was cooled to 23° C. and subjected to one charging cycle followed by eight charging/discharging cycles.

Figure 14:
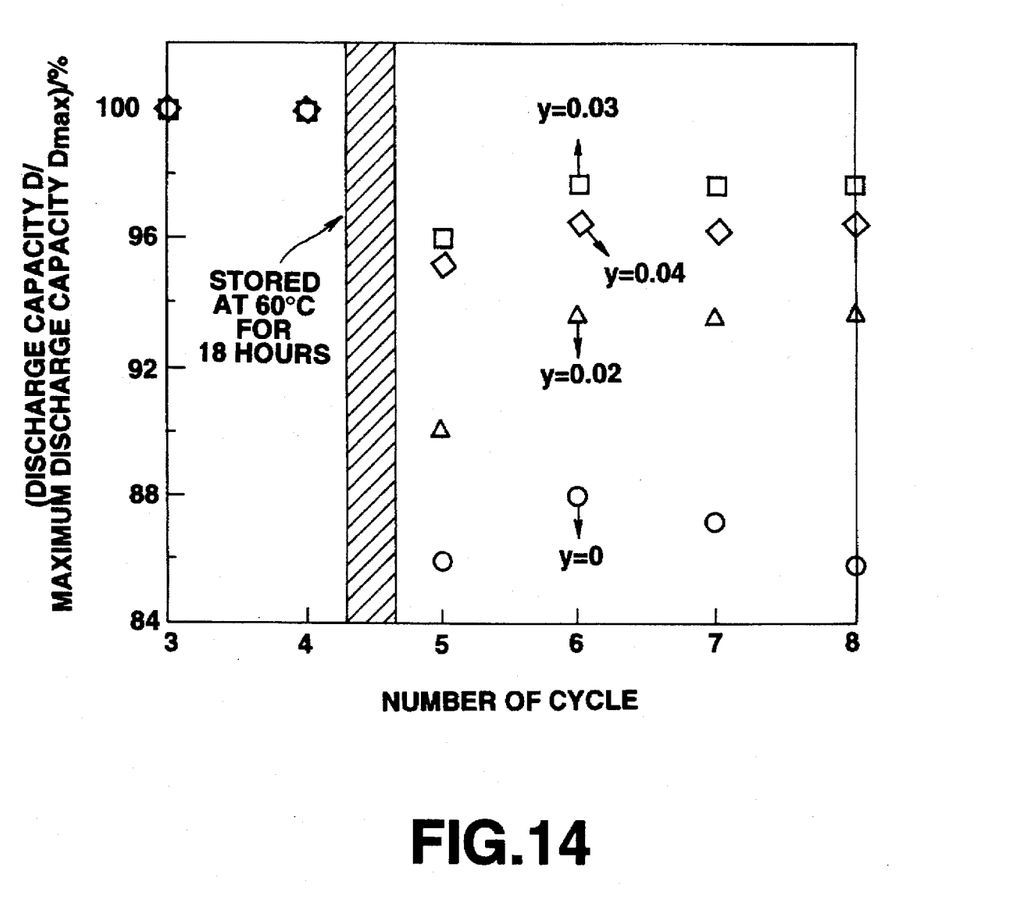
FIG. 14 is a graph showing the relation between the number of cycles of the cell and the capacity retention ratio.

The ratios of the discharging capacity values measured cycle-by-cycle to the maximum discharging cycle $D_{max}$ (=135 mAh/g), that is the capacity retention ratio values, are shown in FIG. 14.

In FIG. 14, the post-storage values of the capacity retention ratio from each cycle are shown. It is thus seen that values of the capacity retention ratio are higher for the cell employing $Li_xV_yCo_{1-y}O_2$ having V substitutionally dissolved therein as the active material for the positive electrode than for the cell employing $Li_xCoO_2$, without regard to the number of the charging/discharging cycles. The value of self-discharge ratio during storage, as calculated by the equation $[100-(D_5/D_{max})]\%$, where $D_5$ denotes the discharge capacity from the fifth cycle, is smaller for the cell employing $Li_xV_yCo_{1-y}O_2$ having V substitutionally dissolved therein as the active material for the positive electrode than for the cell employing $Li_xCoO_2$.

Thus it is seen that the effect of substitutional solid dissolution of V is displayed with actual cells, such that $Li_xV_yCo_{1-y}O_2$ having substitutionally dissolved V therein effective in improving storage characteristics of the cell.

What is claimed is:

1. A non-aqueous liquid electrolyte cell comprising an active cathode material of a vanadium-containing lithium cobalt composite oxide of the formula $Li_xV_yCo_{1-y}O_2$ wherein x is greater than 1.00 and less than or equal to 1.10 and y is greater than or equal to 0.01 and less than or equal to 0.04, said vanadium-containing lithium cobalt composite oxide having a mean grain size of from about 5 to about 30 µm and exhibiting in powder X-ray diffraction studies a ratio of diffraction intensity of the (003) crystal plane to diffraction intensity of the (104) crystal plane, I(003)/I(104), of greater than or equal to 4 and less than or equal to 25.

2. An active cathode material for use in a non-aqueous liquid electrolyte cell comprising a vanadium-containing lithium cobalt composite oxide of the formula $Li_xV_yCo_{1-y}O_2$, wherein x is 1.1 and y is greater than or equal to 0.02 and less than or equal to 0.04, said vanadium-containing lithium cobalt composite oxide having a mean grain size of from about 5 to about 30 µm and exhibiting in X-ray powder diffraction studies a ratio of diffraction intensity of the (003) crystal plane to diffraction intensity of the (104) crystal plane, I(003)/I(104), of greater than or equal to 4 and less than or equal to 25.

3. An active cathode material prepared by a method comprising the steps of:

forming a mixture of lithium carbonate, tricobalt tetraoxide and vanadium trioxide so that the molar ratio of lithium to the sum of vanadium plus cobalt present is 1.1 and the molar ratio of vanadium to the sum of vanadium plus cobalt present is 0.02 or 0.04; and thereafter, sintering the mixture at a temperature of from about 900° to about 1000° C. until formation of a vanadium-containing lithium cobalt composite oxide having the formula $Li_{1.1}V_yCo_{1-y}O_2$ wherein y is equal to 0.02 or 0.04 is substantially complete, said vanadium-containing lithium cobalt composite oxide having a mean grain size of from about 5 to about 30µm and exhibiting in powder X-ray diffraction studies a ratio of diffraction intensity of the (003) crystal plane to diffraction intensity of the (104) crystal plane, I(003)/I(104), of greater than or equal to 4 and less than or equal to 25.

4. A method for making an active cathode material comprising the steps of:

forming a mixture of lithium carbonate, tricobalt tetraoxide and vanadium trioxide so that the molar ratio of lithium to the sum of vanadium plus cobalt present is 1.1 and the molar ratio of vanadium to the sum of vanadium plus cobalt present is 0.02 or 0.04; and thereafter, sintering the mixture at a temperature of from about 900° to about 1000° C. until formation of a vanadium-containing lithium cobalt composite oxide having the formula $Li_{1.1}V_yCo_{1-y}O_2$, wherein y is equal to 0.03 or 0.04 is substantially complete, said vanadium-containing lithium cobalt composite oxide having a mean grain size of from about 5 to about 30 µm and exhibiting in powder X-ray diffraction studies a ratio of diffraction intensity of the (003) crystal plane to diffraction intensity of the (104) crystal plane, I(003)/I(104), of greater than or equal to 4 and less than or equal to 25.

* * * * *